United States Patent [19]
Boutaghou et al.

[11] Patent Number: 5,991,119
[45] Date of Patent: Nov. 23, 1999

[54] PROXIMITY HEAD SLIDER HAVING RECESSED MAGNETORESISTIVE READ TRANSDUCER

[75] Inventors: Zine-Eddine Boutaghou, Vadnais Heights; Dallas Wayne Meyer, Burnsville; Steven Barclay Slade, New Hope, all of Minn.

[73] Assignee: Seagate Technology, Inc., Scotts Valley, Calif.

[21] Appl. No.: 08/962,759

[22] Filed: Nov. 3, 1997

[51] Int. Cl.$^6$ ...................................................... G11B 5/60
[52] U.S. Cl. ................................................................ 360/103
[58] Field of Search ..................................... 360/103, 113

[56] References Cited

U.S. PATENT DOCUMENTS

| | | | |
|---|---|---|---|
| 5,455,730 | 10/1995 | Dovek et al. | 360/113 |
| 5,673,156 | 9/1997 | Chen et al. | 360/103 |
| 5,768,055 | 6/1998 | Tian et al. | 360/103 |

FOREIGN PATENT DOCUMENTS 5-225528  9/1993  Japan .

*Primary Examiner*—David D. Davis
*Attorney, Agent, or Firm*—Westman, Champlin & Kelly, P.A.

[57] ABSTRACT

A proximity magnetoresistive head slider and method of making the same are disclosed. The head slider includes a slider body having an air bearing surface (ABS). An inductive write transducer is formed at a first portion of the ABS. A cavity is formed in the slider body such that a first surface of the cavity forms a second portion of the ABS which is out of plane with the first portion of the ABS. A magnetoresistive (MR) read transducer is positioned in the cavity at the first surface such that the MR read transducer is recessed relative to the inductive write transducer, thereby preventing contact between the MR read transducer and a surface of a disc.

8 Claims, 6 Drawing Sheets

PROXIMITY HEAD SLIDER HAVING RECESSED MAGNETORESISTIVE READ TRANSDUCER

BACKGROUND OF THE INVENTION

The present invention relates generally to data storage system head sliders. More particularly, the present invention relates to a magnetoresistive (MR) proximity head slider having a recessed MR element (MRE) to minimize thermal asperities in the read back signal.

In magnetic disc drive data storage devices, digital data are written to and read from a thin layer of magnetizable material on a surface of one or more rotating discs. Write and read operations are performed through write and read transducers which are carried in a slider body. The slider and transducers are sometimes collectively referred to as a head, and typically a single head is associated with each disc surface. When the read transducer is a magnetoresistive (MR) type sensor, the combination of the slider and the transducer are frequently referred to as an MR head. The heads are selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly above the disc surface.

In operation, the MRE of the head can come into contact with asperities on the surface of the disc. This is particularly true in proximity type heads where the inductive write transducer comes into frequent contact with the glide avalanche of the media. Potentially, this contact between the MRE and asperities can cause data written to a particular location on the disc to be lost. Immediately after contact with an asperity, the heat generated by the contact changes the resistive properties of the MR sensor. As a result, the corresponding signal read by the MR head is distorted by a voltage spike and subsequent decay, sometimes causing the data stored near the asperity to be unrecoverable. The voltage spike in the read back signal is frequently referred to as a "thermal asperity," while the defect on the disc is referred to as an "asperity". However, since one is indicative of the other, the two terms are frequently used interchangeably. Since a large number of thermal asperities appear in the read back signal from contact with the glide avalanche of the media, the concept of MR proximity which involves direct contact of the MRE with the media is not feasible with the existing MRE sensitivity to thermal asperities.

SUMMARY OF THE INVENTION

A proximity magnetoresistive head slider and method of making the same are disclosed. The head slider includes a slider body having an air bearing surface (ABS). An inductive write transducer is formed at a first portion of the ABS. A cavity is formed in the slider body such that a first surface of the cavity forms a second portion of the ABS which is out of plane with the first portion of the ABS. A magnetoresistive (MR) read transducer is positioned in the cavity at the first surface such that the MR read transducer is recessed relative to the inductive write transducer, thereby preventing contact between the MR read transducer and a surface of a disc.

DETAILED DESCRIPTION OF THE PREFERRED EMBODIMENTS

The present invention is based in part upon the recognition that with MR head advancements, the MRE can be designed to remain clear of the disc without substantial impact on electrical performance and on the flying regime. At the same time, the inductive write element can be designed to be in contact with the glide avalanche of the disc to overcome future low inductance and high disc coercivities required for high areal density and data rate applications. According to the present invention, the MRE region is recessed to avoid contact of the MRE with the media glide avalanche throughout the life of the head slider and to allow the inductive element to be in contact with the media. Advances in MRE design and materials (i.e., such as soft sendust SAL, hot MRE deposition, and spin valve designs) and/or the net reduction in head-media spacing from using a proximity advanced air bearing (AAB) provide a sufficient boost in amplitude to overcome spacing loss from the MRE recession. In the head sliders of the present invention, the inductive transducer will be in contact with the media and will ultimately be burnished, thereby reducing the initial MRE separation.

Figure 1:
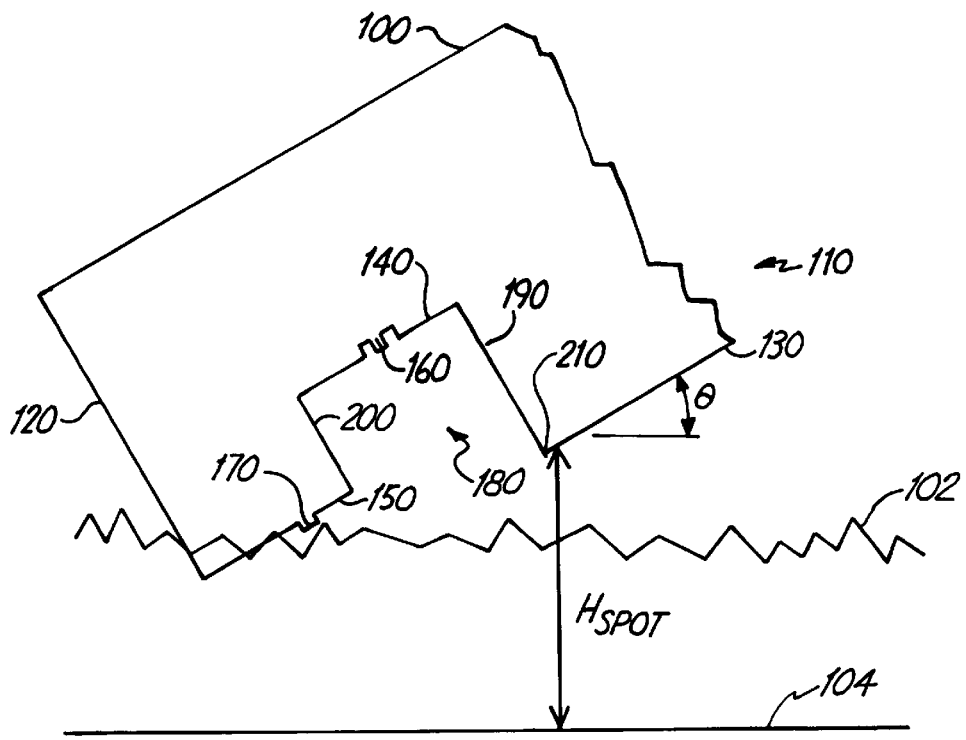
FIG. 1 is a diagrammatic side view of a portion of a head slider in accordance with preferred embodiments of the present invention.

FIG. 1 is a diagrammatic illustration of a portion of head slider 100, flying over glass disc 104 at pitch angle θ and in contact with the media glide avalanche 102, in accordance with preferred embodiments of the present invention. Head slider 100 includes ABS 110 and trailing edge face 120. In some preferred embodiments, ABS 110 lies in at least three planes arranged to form a cavity or recessed area 180 in which MRE 160 (i.e., the MR sensor or transducer) is positioned to prevent contact between the MRE and glide avalanche 102 of the media. However, in other embodiments the ABS lies in at least two planes arranged to form the cavity. As illustrated in FIG. 1, ABS 110 includes first portion 130, second portion 140 and third portion 150. In addition to ABS portion 140, recess or cavity 180 also includes sides or walls 190 and 200, which in preferred embodiments, can be oriented substantially perpendicular to one or more of surfaces 130, 140 and 150. Cavity wall 190 and portion 130 of ABS 110 form corner 210. The distance between corner 210 and glass disc 104 is designated $H_{SPOT}$. With inductive write transducer 170 formed on portion 150 of ABS 110, write transducer 170 can be in contact with glide avalanche 102 without causing contact between glide avalanche 102 and MRE 160.

Figure 2:
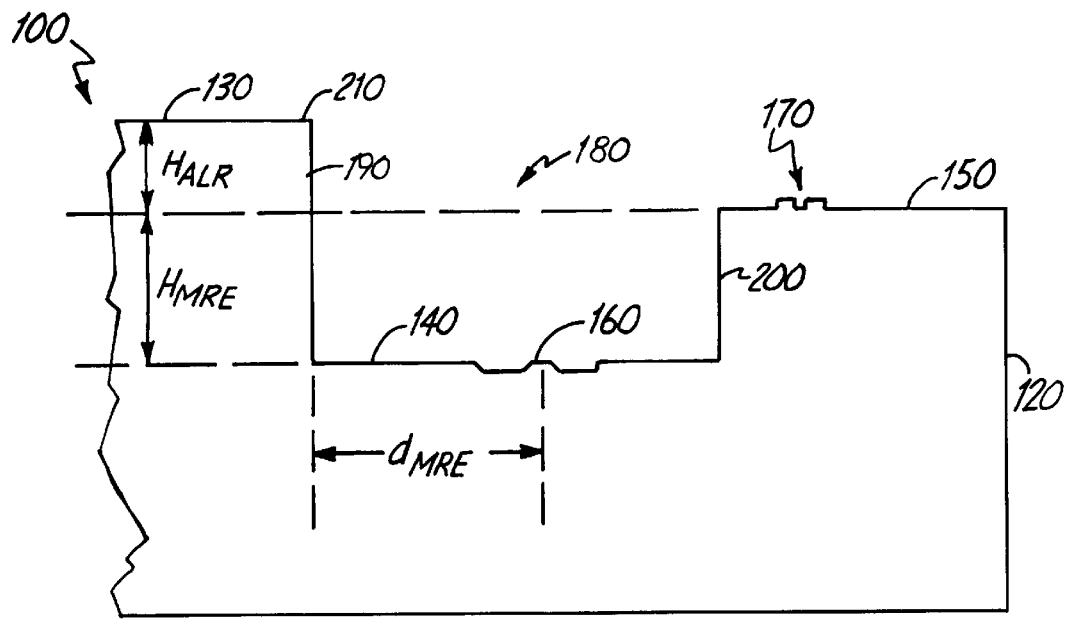
FIG. 2 is a diagrammatic upside-down side view of the portion of the head slider illustrated in FIG. 1 which shows features of the present invention in greater detail.

FIG. 2 is a diagrammatic upside-down side view of portions of head slider 100 illustrated in FIG. 1. FIG. 2 illustrates various dimensions of head slider 100, some of which are used below in Equation 1. To insure that the MRE 160 will not be in contact with the media glide avalanche 102, the MRE 160 conditional separation (first order model) shown below in Equation 1 can be used during the design of head slider 100.

$$(H_{SPOT} - 3\sigma) + (H_{ALR} + H_{MRE}) - d_{MRE} * \text{pitch} > \text{GHA} \quad \text{Equation 1}$$

where:

$H_{SPOT}$ is the height of corner 210 above disc 104;

$H_{ALR}$ is the vertical distance or amount of recession of portion 150 of ABS 110 relative to portion 130 of ABS 110;

$H_{MRE}$ is the vertical distance or amount of recession of portion 140 of ABS 110 relative to portion 150 of ABS 110;

$d_{MRE}$ is the distance between MRE 160 and wall 190 of cavity 180;

Pitch is the sine of the angle θ at which head slider 100 flies above disc 104, and since angle θ is small can be approximated as angle θ; and GHA is the media glide height avalanche.

A primary benefit of head slider 100 of the present invention is that MRE contact with the media is avoided in proximity applications. A simplified analysis can be used to demonstrate that the concept of the present invention, of avoiding MRE contact with the media throughout the life of the product, is feasible for existing ABS designs. For one specific advanced air bearing (AAB) design with a media having a GHA of 0.7 microinch, the condition of Equation 1 to be satisfied in order to insure that no contact of the MRE with the alumina will occur is $H_{MRE} + H_{ALR} > 0.3$ microinch. This condition can be satisfied for a standard ALR process of 0.2 microinch and for an MRE recession $H_{MRE}$ (relative to inductive writer 170) of greater than 0.1 microinch. Holding this concept to be true, even at 10,000 feet where an MRE recession $H_{MRE} + H_{ALR}$ of greater than 0.45 microinch (0.1+0.35) is needed to compensate for fly height loss due to altitude, the desired MRE recession of between 0.4 and 0.5 microinch is reasonable and acceptable.

The electrical performance of MRE 160 is expected to improve over time due to the inductive poles of write transducer 170 wearing and the distance between MRE 160 and the media being reduced. Thus, the final recession of MRE 160 relative to portion 130 of ABS 110 may be considerably less than 0.4 or 0.5 microinches, depending on the AAB design and choice of media. In preferred embodiments, $H_{MRE}$ is at least about 0.05 microinch. In preferred embodiments in which the portions of the ABS forming the cavity lie within at least three planes (i.e., embodiments in which $H_{ALR}$ does not equal zero), $H_{ALR} + H_{MRE}$ is preferably at least about 0.1 microinch.

Figure 3:
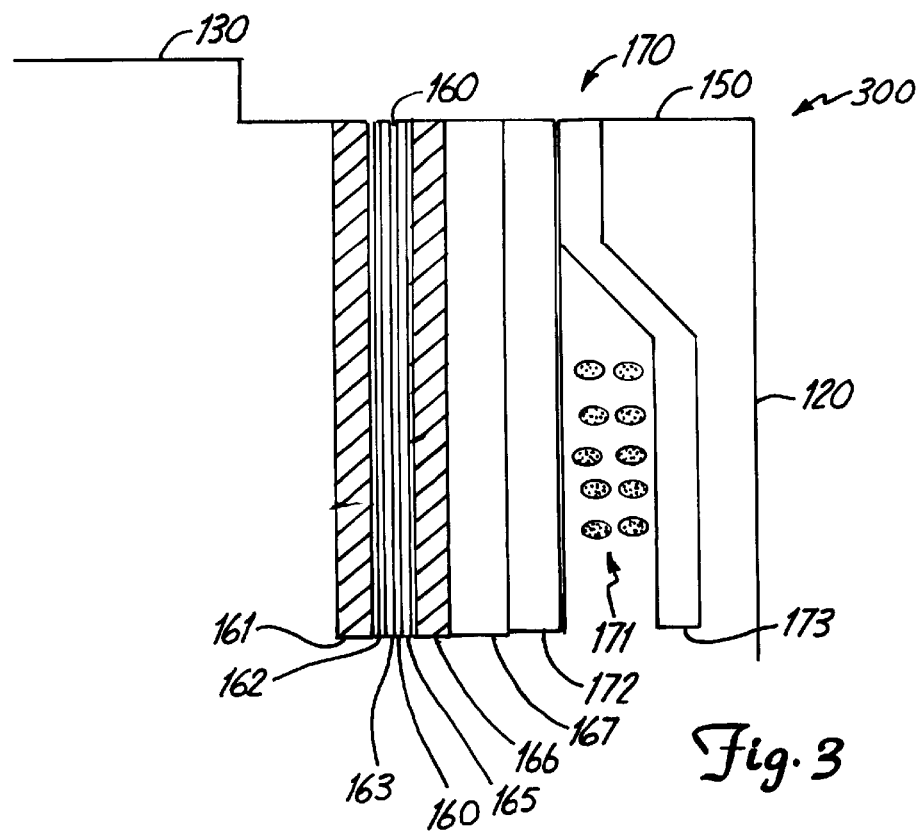
FIG. 3 is a diagrammatic upside-down side view illustrating a first read and write transducer configuration of a head slider which can be provided as a first step in a method of fabricating the head sliders of the present invention.
Figure 4:
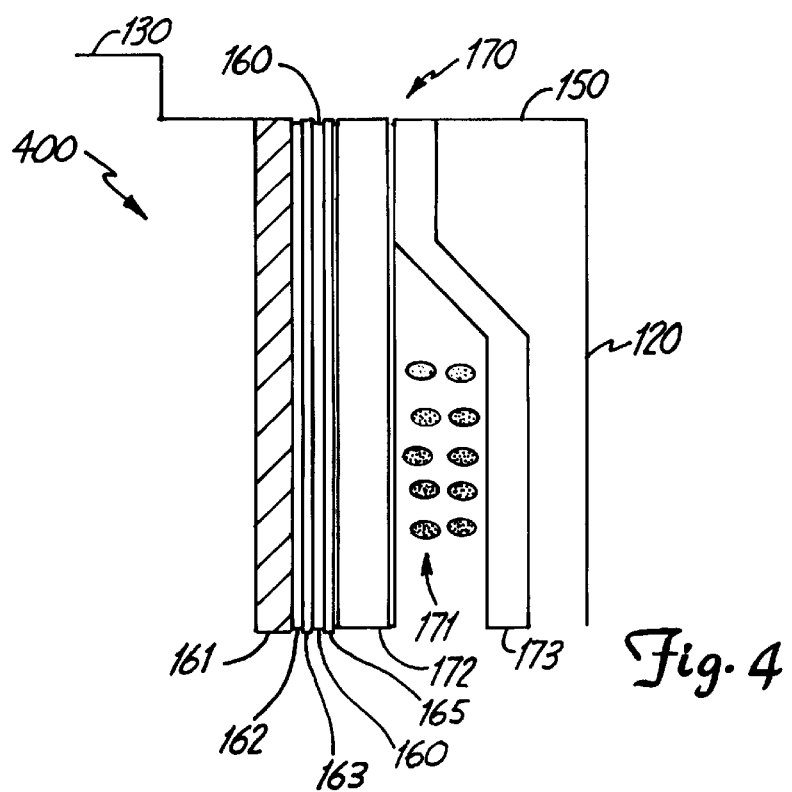
FIG. 4 is a diagrammatic upside-down side view illustrating a second read and write transducer configuration of a head slider which can be provided as a first step in a method of fabricating the head sliders of the present invention.

FIGS. 3 and 4 depict two typical MR head slider configurations, in which the MR read element and inductive write element either share a common pole (called a shared pole) or have separate poles separated by an insulating layer, which can be used to create head slider 100 of the present invention. Thus, providing one of head sliders 300 or 400 illustrated in FIGS. 3 or 4 can be the first step in a method of fabricating head slider 100 of the present invention. However, it should be noted that head sliders having configurations other than those of head sliders 300 and 400 can be provided as the first step in producing head slider 100 of the present invention as well.

In head slider 300 illustrated in FIG. 3, the MRE read transducer includes MRE 160 surrounded by shield 161, soft adjacent layer (SAL) 162, insulating gap layer 163, insulating gap layer 165 and shield 166. Write transducer 170 includes inductive coils 171, bottom pole 172 and top pole 173. Shield 166 and bottom pole 172 are separated by insulating layer 167. Prior to alteration of head slider 300 to produce head slider 100, MRE 160 and write transducer 170 each terminate at or extend to portion or surface 150 of the ABS. Head slider 400 illustrated in FIG. 4 differs from head slider 300 only in that shield 166 and insulating layer 167 have been eliminated. In this case, pole 172 is a common or shared pole of both the MR read transducer and the inductive write transducer. For ease of illustration, the remaining steps in the method of fabricating head slider 100 of the present invention are illustrated with reference to head slider 300 shown in FIG. 3.

Figure 5:
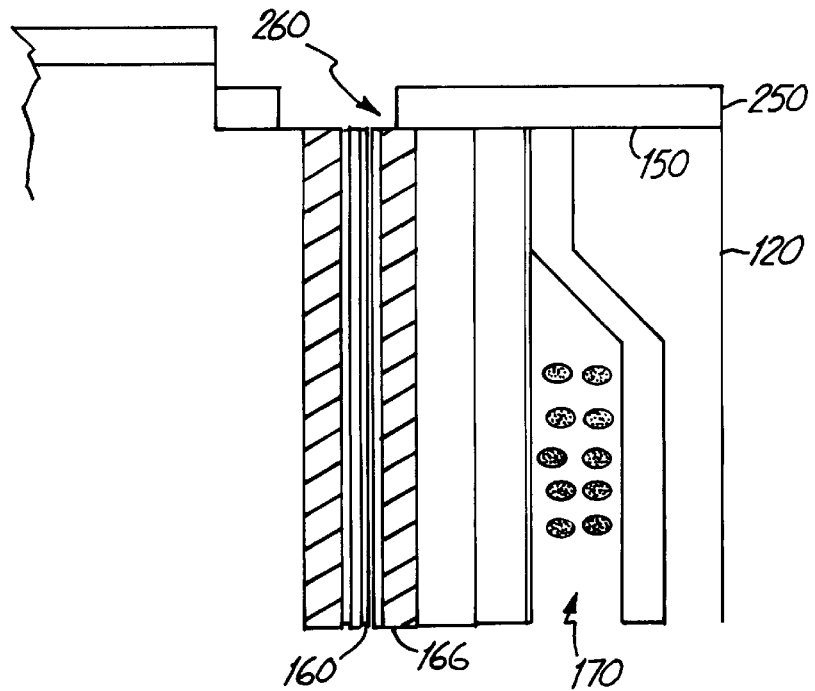
FIG. 5 is a diagrammatic upside-down side view illustrating a second step in the method of fabricating the head sliders of the present invention.

FIG. 5 illustrates the next step in the preferred method of fabricating head slider 100 of the present invention. As shown in FIG. 5, MRE region 260 is masked such that adjacent regions of the ABS other than MRE region 260 are covered with photoresist 250. MRE region 260, which will correspond to cavity 180 illustrated in FIGS. 1 and 2, may include the shared pole or insulating layer.

Figure 6:
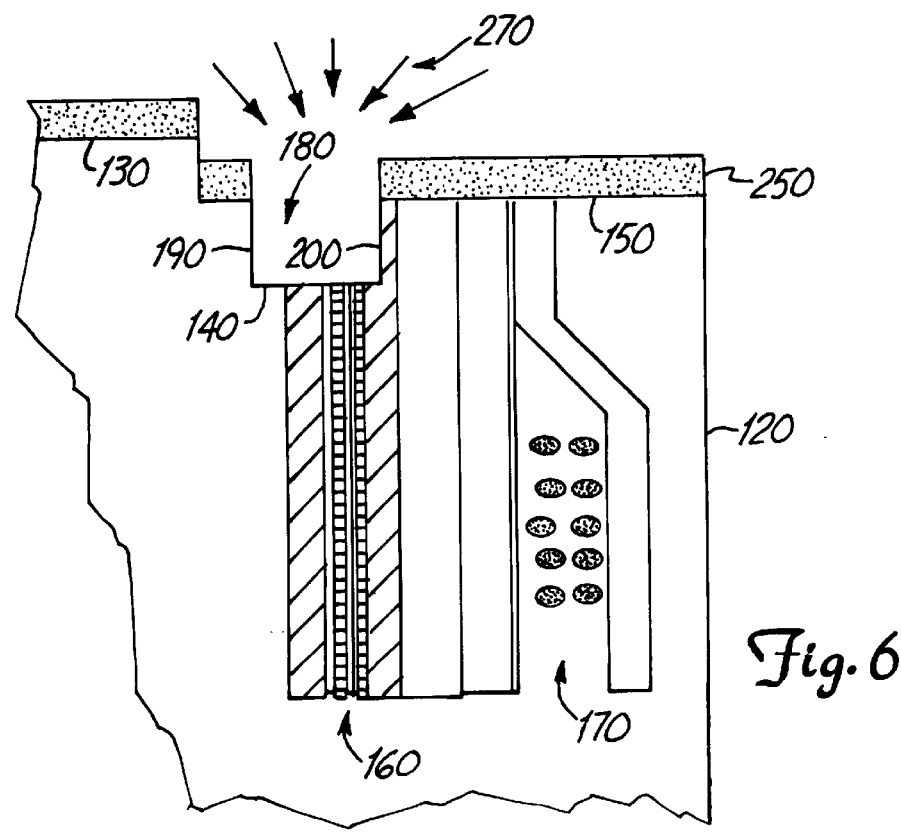
FIG. 6 is a diagrammatic upside-down side view illustrating a third step in the method of fabricating the head sliders of the present invention.

Next, as illustrated in FIG. 6, MRE region 260 is exposed to ion milling or other dry etch processes, such as sputter etching or focused ion beam etching, to create recession or cavity 180. The bottom of cavity 180 can be portion 140 of ABS 110. The depth of cavity 180 can be controlled such that the requirements of Equation 1 are satisfied. Cavity 180 includes sides or walls 190 and 200.

Figure 7:
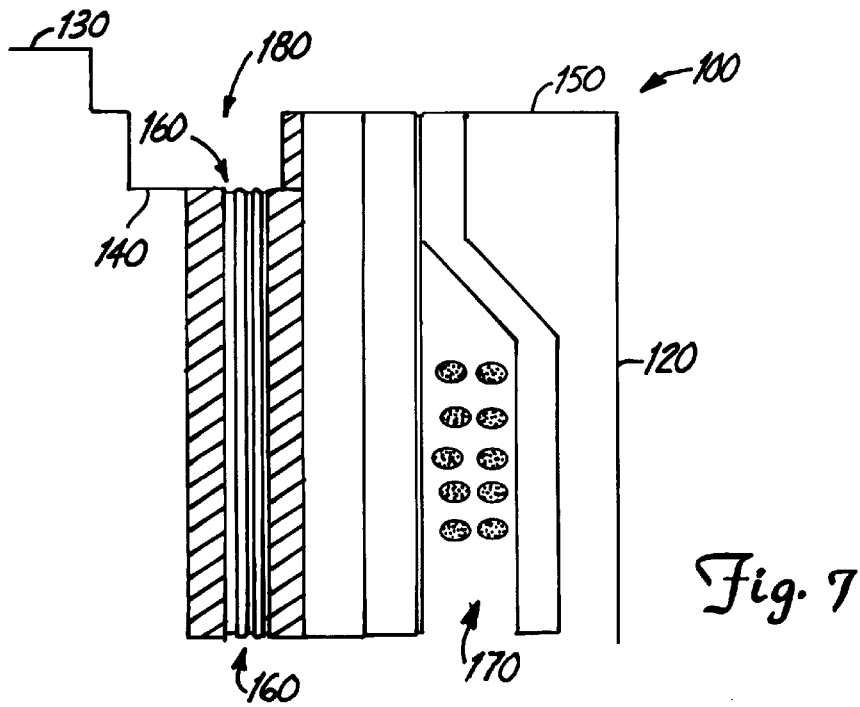
FIG. 7 is a diagrammatic upside-down side view illustrating a fourth step in the method of fabricating the head sliders of the present invention.
Figure 8:
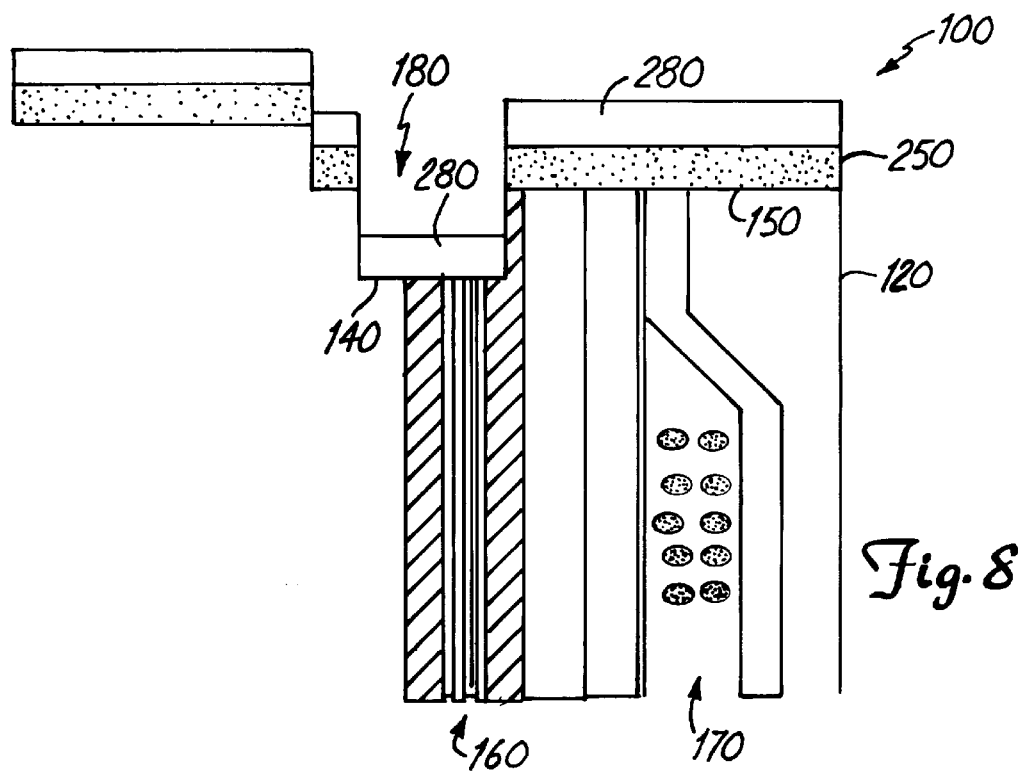
FIG. 8 is a diagrammatic upside-down side view illustrating an optional step in the method of fabricating the head sliders of the present invention.
Figure 9:
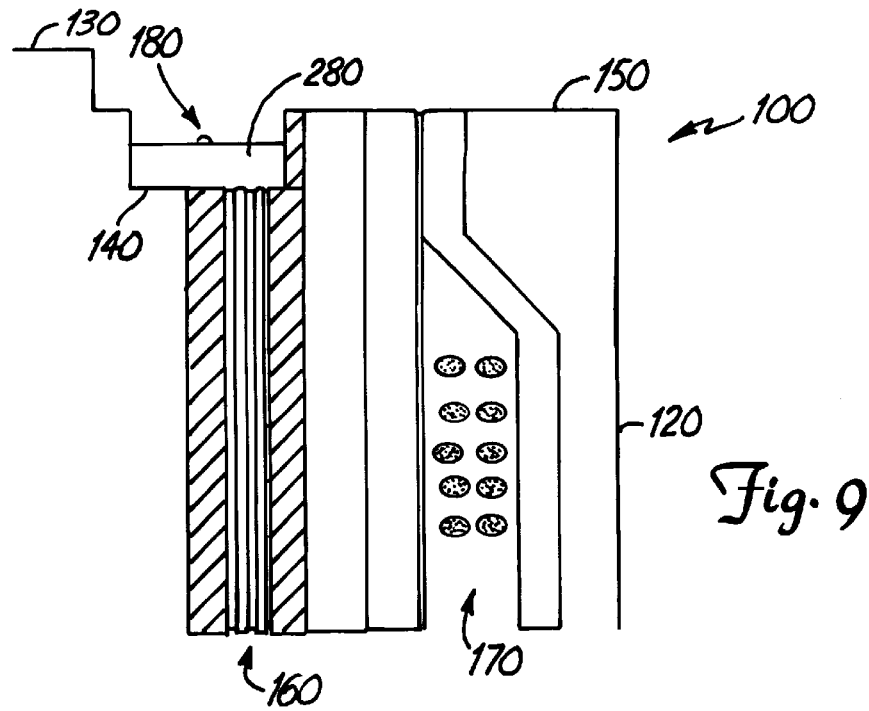
FIG. 9 is a diagrammatic upside-down side view illustrating an optional step in the method of fabricating the head sliders of the present invention which follows the step illustrated in FIG. 8.

As illustrated in FIG. 7, the next step in the preferred method of fabricating head slider 100 of the present invention is to remove photoresist 250 from the ABS surfaces of the slider body. This leaves head slider 100 with MRE 160 recessed within cavity 180 and write transducer 170 extending to portion 150 of the ABS. Optionally, as illustrated in FIG. 8, prior to removal of photoresist 250, diamond like carbon (DLC) or other corrosion resistant material 280 can be deposited in cavity 180 and on other portions of the ABS. Subsequently, as illustrated in FIG. 9, photoresist 250 can then be removed to remove portions of material 280 which had been deposited outside of cavity 180. This leaves cavity 180 partially filled with material 280 in order to protect the MRE and/or to minimize the effect of cavity 180 on the flying performance of head slider 100. In the alternative, photoresist 250 can be removed prior to deposition of material 280 on the ABS of head slider 100. In this instance, the corrosion resistant material will remain on the entire ABS, including portions outside of cavity 180.

Figure 10:
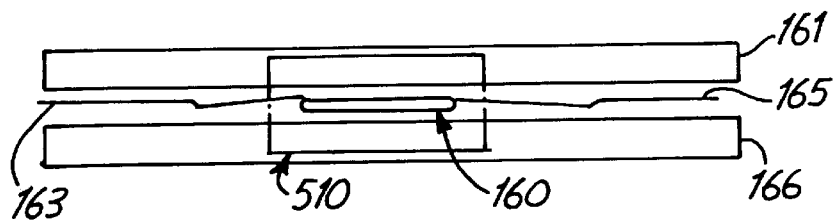
FIGS. 10 and 11 are diagrammatic ABS and side views illustrating one feature of some embodiments of the present invention.
Figure 11:
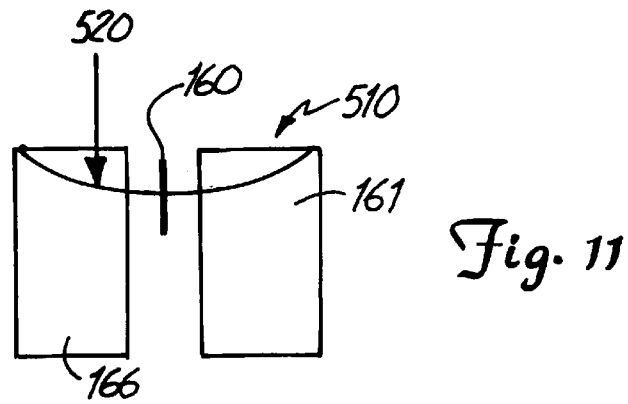

As illustrated in FIGS. 10 and 11, etching can be performed along the width of MRE 160 in a manner which will reduce or minimize the amount of debris which will collected in the cavity. As illustrated in FIGS. 10 and 11, if desired etching area 510 can be etched to produce cut angle 520 designed to reduce the debris in the cavity.

Figure 12:
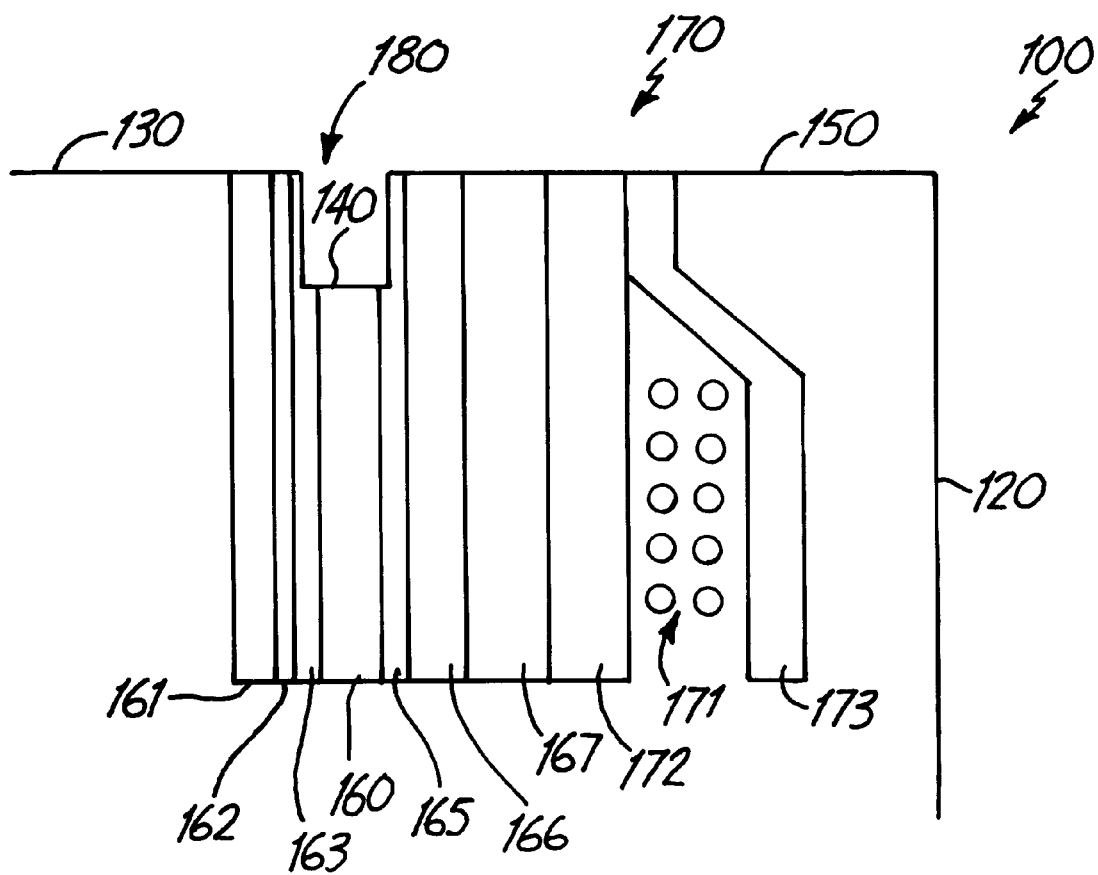
FIG. 12 is a diagrammatic upside-down side view of an alternate embodiment of the head sliders of the present invention in which the cavity formed in the ABS is limited in width to the MRE and portions of the electrical conductors.

FIG. 12 illustrates an embodiment of head slider 100 in which cavity 180 is narrower, only encompassing MRE 160 and all or portions of insulating gap layers 163 and 165. While the embodiments of the present invention illustrated in the previous FIGS. can be created using a photo process, the narrow cavity illustrated in FIG. 12 is preferably created using a laser beam or focused ion beam process. FIG. 12 also illustrates another feature of the present invention which can be optionally utilized in any embodiment. Since MRE 160 is protected within cavity 180, the conventional recess distance $H_{ALR}$ between ABS portions 130 and 150 can be eliminated. Thus, the distance $H_{ALR}$ can be set to zero and portions 130 and 150 on either side of cavity 180 created coplanar with one another. By eliminating the recess distance $H_{ALR}$ 160 can be recessed within cavity 180 by distance $H_{MRE}$ and still be closer to the media than in conventional sliders 300 and 400.

Using the method of the present invention of fabricating head slider 100, if etching of the shared pole between the read and write transducers is not desired due to an impact on magnetic domain configurations or stability, the exposure of the shared pole during dry etching can be corrected by designing two independent shields, one for the writer 170 and one for the reader 160. Also, the etching rates of different MR materials can be different and will vary with the incident angle of the ion beam. Thus, optimization of the proper combination of etch type, angle and exposure times will likely be MR material dependent. Also, creating an MRE recession or cavity may have some negative impact on the tribological performance of the ABS due to potential smear/debris sites. However, since the contact point is designed to be far away from the MRE, this is not likely to be a problem. Further, dry etching of the MRE may induce unwanted stability issues with the MRE electrical response. However, since some existing products are exposed to extended DLC sputter etching with no signs of increased MRE instability, it is not believed that the etching of the MRE will have a significant negative impact. Further still, it is believed that milling removes residual stresses from the lapping process.

Although the present invention has been described with reference to preferred embodiments, workers skilled in the art will recognize that changes may be made in form and detail without departing from the spirit and scope of the invention.

What is claimed is:

1. A proximity magnetoresistive (MR) head slider for use with a data storage disc, the MR head slider comprising:
   a slider body having an air bearing surface (ABS); the ABS having a first, second and third portion;
   an inductive write transducer formed at the third portion of the ABS making at least intermittent contact with a surface of the disc;
   a cavity formed at the second portion of the ABS, the second portion of the ABS being out of plane with the first portion, and the third portion of the ABS; and the first portion being out of plane with the third portion and;
   an MR read transducer formed in the cavity at the second portion such that the MR read transducer is recessed relative to the inductive write transducer, thereby preventing contact between the MR read transducer and the surface of the disc.

2. The MR head slider of claim 1, wherein the second portion of the ABS is formed out of plane with the third portion of the ABS by a first distance such that the MR read transducer is recessed relative to the inductive write transducer by at least about 0.05 microinch.

3. The MR head slider of claim 2 wherein the cavity formed in the slider body lies immediately between and separates the first and third portions of the ABS, and wherein the MR read transducer is recessed relative to the first portion of the ABS by at least about 0.1 microinch.

4. The MR head slider of claim 3, and further comprising a layer of corrosion resistant material formed in the cavity on top of the MR read transducer such that the layer of corrosion resistant material is positioned between the MR read transducer and the surface of the disc.

5. A disc drive data storage system comprising:
   a data storage disc having a surface; and
   a proximity head that moves relative to the surface of the data storage disc as the data storage disc rotates, wherein the proximity head comprises an air bearing surface (ABS) having a first, second and third portion with the first portion out of plane with the second and third portion and the second portion out of plane with the third portion:
      an inductive write transducer extending from a third portion of the air bearing surface (ABS) of the proximity head and making at least intermittent contact with the surface of the data storage disc; and
      a magnetoresistive (MR) read transducer extending from a second portion of the ABS of the proximity head, wherein the second portion of the ABS is recessed relative to the first portion of the ABS by at least about 0.05 microinch preventing contact with the MR read transducer and the surface of the data storage disc.

6. The disc drive data storage system of claim 5, wherein the second portion of the ABS is immediately adjacent the first portion of the ABS.

7. The disc drive data storage system of claim 6, wherein the third portion of the ABS is positioned immediately adjacent the second portion of the ABS such that the second portion of the ABS separates the first and third portions of the ABS, and wherein each of the third and second portions of the ABS are recessed relative to the first portion of the ABS, and wherein the second portion of the ABS and the MR read transducer are recessed from the first portion of the ABS by at least about 0.1 microinch.

8. The disc drive data storage system of claim 7, wherein the second portion of the ABS forms a cavity between the first and third portions of the ABS, wherein the proximity head further comprises a layer of corrosion resistant material formed in the cavity between the MR read transducer and the surface of the disc.

* * * * *